EXTENDED PHASE DETECTOR FOR PHASE-LOCKED LOOP RECEIVERS

Filed March 11, 1965

INVENTOR.
GEORGE A. McKAY
BY Harry A. Herbert Jr
ATTORNEY
Eugene J. Pawlikowski
AGENT INVENTOR
GEORGE A. McKAY
BY Harry A. Herbert Jr
ATTORNEY
Eugene J. Pawlikowski
AGENT INVENTOR.
GEORGE A. McKAY
BY Harry A. Herbert Jr
ATTORNEY
Eugene J. Pawlikowski
AGENT

EXTENDED PHASE DETECTOR FOR PHASE-LOCKED LOOP RECEIVERS

Filed March 11, 1965 4 Sheets-Sheet 4

INVENTOR.
GEORGE A. McKAY
BY Harry A. Herbert Jr
ATTORNEY
Eugene J. Pawlikowski
AGENT United States Patent Office 3,358,240
Patented Dec. 12, 1967

3,358,240 EXTENDED PHASE DETECTOR FOR PHASE-LOCKED LOOP RECEIVERS

George A. McKay, Glen Burnie, Md., assignor, by mesne assignments, to the United States of America as represented by the Secretary of the Air Force Filed Mar. 11, 1965, Ser. No. 439,107
4 Claims. (Cl. 329—122)

This invention relates to phase-coherent demodulating circuits and, particularly, to a phase-lock circuit for extending the permissible total phase error deviation beyond limits heretofore unattainable.

The elements of a typical phase-lock circuit include a phase detector multiplier which beats a constant-amplitude phase-modulated signal with the local oscillations of a voltage-controlled oscillator (VCO) operating initially at a close estimate of the frequency of the incoming signal. The multiplier gives rise to a low-frequency voltage proportional to sin $[\Phi_i(t)-\Phi_o(t)]$, where $\Phi_i(t)$ is the instantaneous phase of the input signal and $\Phi_o(t)$ the instantaneous phase of the loop oscillation supplied by the VCO. The loop further contains a loop filter which accepts the output of the multiplier and changes the frequency of the VCO. The bandwidth of the loop filter is too narrow to pass the modulation frequencies and so only the average frequency of the incoming signal is tracked. Any modulation of the incoming signal will then appear as an instantaneous phase error voltage of the input and loop signals. The phase error voltage is filtered by the loop filter which tends to drive the VCO in a direction such as to reduce the relative phase error to zero. The frequency of the VCO is automatically and continually adjusted to reach coincidence with the instanteous frequency of the incoming signal in order to lock the phase of the oscillations of the VCO in quadrature with the phase of the incoming signal.

When phase coherence has been established, and provided the input is not varying in phase, the loop oscillation of the VCO will be identical in frequency to the input signal, but lagging in phase by ninety degrees. The local oscillation from the VCO therefore is said to be locked to the incoming sinusoid if the phase difference between the two is maintained near this quadrature value. The output voltage of the loop filter indicates the magnitude and the sign of any deviation from their quadrature phase relationship. This, then, becomes the point from which relative loop phase coherence is measured.

Under the preceding conditions of a 90° phase difference at phase lock, limits are imposed on the range over which it is possible to maintain phase coherence. This is so because the slope of the error-loop voltage curve approaches zero as the relative phase error approaches ±90°. If the relative phase error exceeds ±90°, the error voltage decreases to the point that the loop oscillator is driven apart from a phase-lock condition with the input and the loop falls out of lock. Phase coherence thus ceases and must be reacquired. Thus, to maintain the modulation phase error at some specified amount less than ±90°, the inputs comprising the original modulating signals at the remote transmitting source must be closely controlled, all the while taking into account expected noise interference. In fact, practical constraints will generally reduce the operational linear region of the transfer curve and thus force the useable limits of phase error deviation to less than ±90°.

Accordingly, an object of the invention is to provide a phase-lock loop free to accept phase error deviations of grater than ±90°.

Another object of the invention is the provision of a phase-lock loop wherein the limits of detecting phase error deviations are extended approximately over a range of ±180°.

A further object of the invention is to provide a phase-lock loop having the property of permitting a reduction of power of the transmitting source with an increase of the power in the useable sidebands.

Still another object of the invention is the provision of a phase-lock loop wherein a reduction of transmitter power may be realized at no cost to the quality of transmission.

Yet another object of the invention is to provide a phase-lock loop of a character that once the loop is in lock it will maintain phase coherence down to an $S/N$ ratio appreciably lower than previous minimum threshold criteria.

Other objects and features of the invention will become apparent as the specification proceeds.

In accodrance with the invention, and to accomplish the foregoing objects, the novel phase-lock loop embodying the invention is such that an incoming signal reduced to an intermediate frequency is simultaneously applied in broadside fashion to a plurality of phase detector channels. At the same time, a VCO signal is applied to each phase detector but with successive phase shifts of 45° introduced to the VCO signal in the order of their feeding to the phase detectors. The phase-shifted output signals are applied respectively to a plurality of amplifiers certain ones of which are biased to different quiescent operating points. A logic control circuit fed by other ones of the amplifiers sequentially selects the amplifier whose instantaneous output voltage falls on the linear portion of its transfer curve. By thus assigning preselected quiescent operating points to the amplifiers, and using the output of only one or the other of the amplifiers at any given time, a composite transfer curve is constructed the branches of which extend over the linear operating regions of the several amplifiers thereby to extend the limits of allowable phase-error deviation with no sacrifice in linearity.

Figure 1:
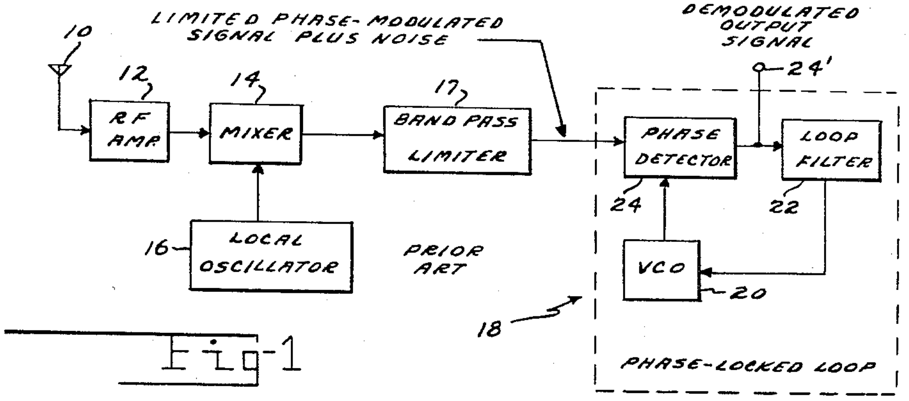
FIG. 1 shows a prior art phase-lock system in schematic form.

For a typical communications assignment in, for example, a spacecraft-to-earth telemetry link, the phase-lock loop for such applications commonly will be preceded by a bandpass limiter to permit the loop to operate acceptably over a wide range of input signals and noise levels. The elements of such a typical phase-lock loop are shown in FIG. 1. The signal input incident on antenna 10 may be assumed to consist of a phase-modulated radio-frequency carrier plus noise. An amplifier 12 establishes a suitable $S/N$ ratio following which the signal is beat in a mixer 14 with the output of a local oscillator 16. The converted signal is applied to a bandpass limiter 17 which conveniently may be made up of a clipper and a bandpass filter in cascade. A phase-lock loop designated as a whole by the reference character 18 includes a voltage controlled oscillator 20, a loop filter 22, and a phase detector or multiplier 24. The signal from limiter 17, at the intermediate frequency, is fed to the input of phase detector 24. From prior explanation, oscillator 20 provides a reference signal which initially is of nearly the same frequency as that of the desired frequency at this point in the receiver, the carrier of which is at the intermediate frequency. The output of phase detector 24 is to ensure phase locking of the reference signal at 90° with respect to the desired signal. Accordingly, in the pre-locked condition when the desired signal is received, phase detector 24 produces a sinusoidal voltage at the phase difference between that of the incoming signal and that of the reference signal from VCO 20. A regenerative action takes place which ends when VCO 20 produces a reference signal which is phase-locked to the incoming signal at the intermediate frequency. Modulation information on the input is, of course, recovered at output terminal 24' as explained above.

Figure 3:
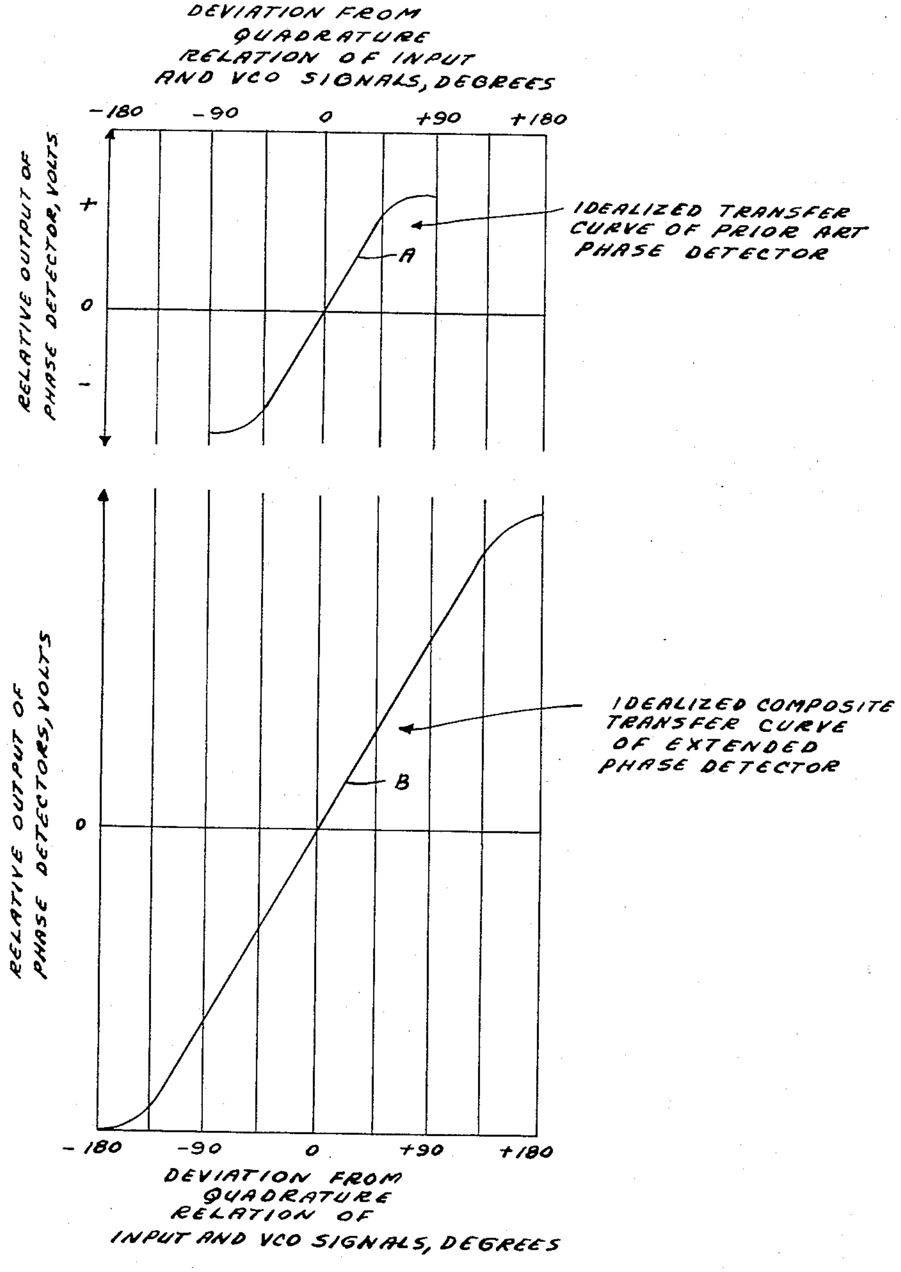
FIGS. 3, 4 and 5 illustrate several time-related sets of waveforms useful for understanding the invention embodiment of FIG. 2.

A transfer curve typical of ideal operation of a phase-lock loop of the type shown in FIG. 1 is given by curve A of FIG. 3. There it clearly may be seen that the boundaries of the linear portion of the curve fall well within the limits ±90°.

Figure 2:
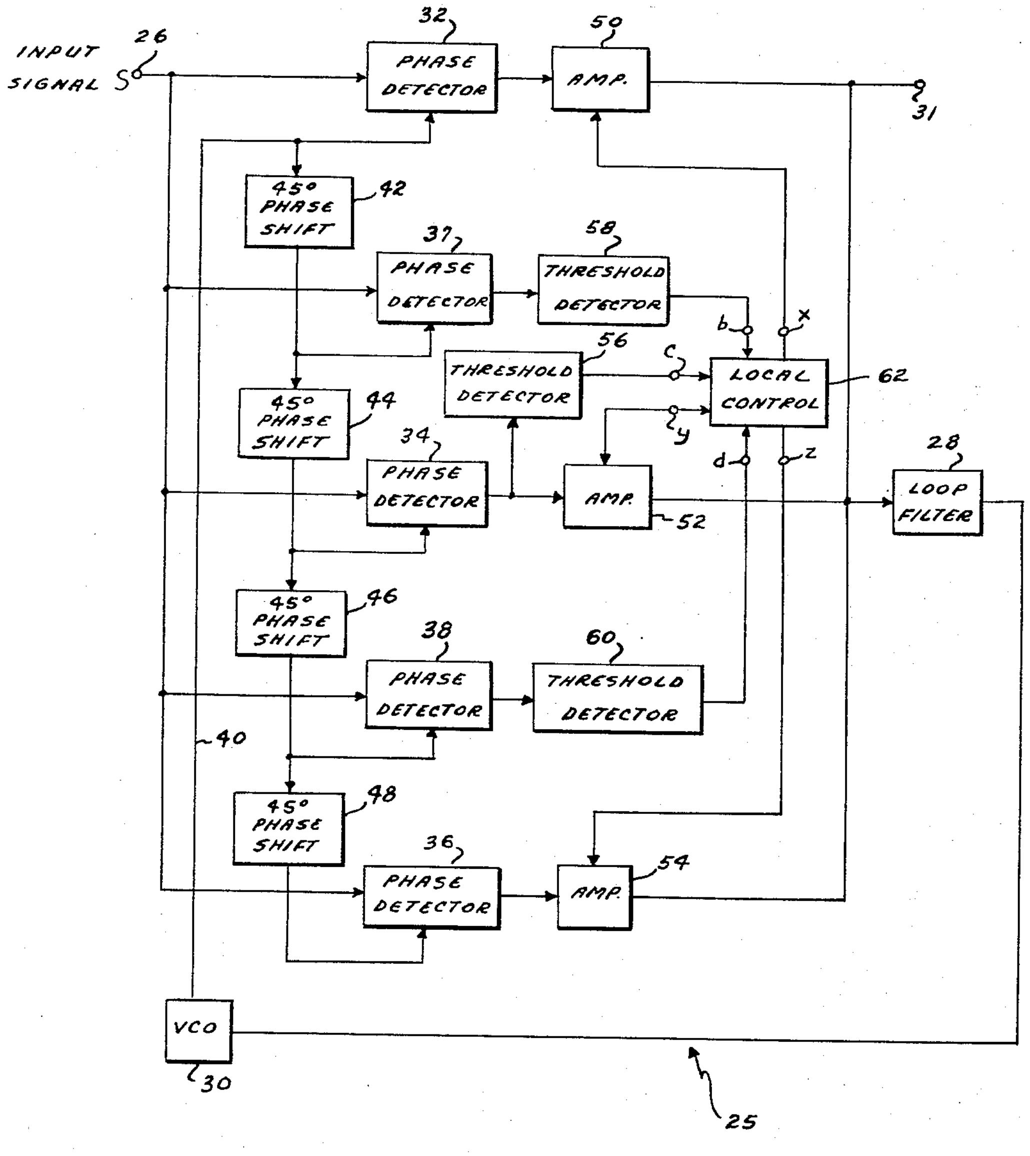
FIG. 2 is a schematic diagram of the extended phase detector embodying the invention.

Referring now to FIG. 2, an arrangement of a phase-lock loop according to one form of the invention, generally referenced 25, comprises an input terminal 26 to which is applied a signal S taken, for example, from a bandpass limiter of the type illustrated in FIG. 1. As will be explained in greater detail below, loop 25 is eminently suitable for tracking the carrier of an *FM/PM* system, for the FM subcarrier spectrum will appear as the final output. As defined, an *FM/PM* system is one in which one or more data sources frequency-modulate one or more subcarrier oscillators, which are then frequency multiplexed and phase-modulate an RF carrier.

The impressed signal, at the intermediate frequency, is of essentially constant-amplitude and includes the total received phase spectrum. A loop filter 28 and VCO 30 perform functions identical to those of the corresponding elements 22 and 20, respectively, shown in FIG. 1. Loop filter 28 accordingly will track only the average carrier frequency. The reactance tube portion of VCO responds in a direction to maintain a quadrature relationship between the incoming signal and the reference oscillations, i.e., if the phase error voltage drifts in a direction indicating an increase in VCO frequency as compared with the received carrier frequency VCO 30 reacts to reduce the oscillator frequency. On the other hand, if the phase error voltage drifts in a direction indicating a decrease in oscillator frequency the exact opposite action takes place. From previous explanation, recovery of the modulation input is at output terminal 31.

As illustrated in FIG. 2, loop 25 comprises three individual phase-lock loops each capable of acting independently of, yet harmoniously with, the others in the task of achieving phase lock. The phase detectors operating in these loops are identified by the reference characters 32, 34 and 36. Two other phase detectors 37 and 38 are included. The incoming signal at terminal 26 is applied simultaneously to each of the detectors to form one input thereof. The output of VCO 30 is applied directly to phase detector 32 over line 40 and thence to the other phase detectors through cascaded 45° phase shifters 42, 44, 46 and 48. Producing a 45° phase shift is readily possible through the use of low pass RC filters. The phase shift per stage being the same, the phase-shifted VCO voltages applied to phase detectors 37, 34, 38 and 36 are delayed successively by phase amounts of 45°, 90°, 135° and 180°, respectively, relative to the undelayed VCO signal applied to phase detector 32.

Figure 4:
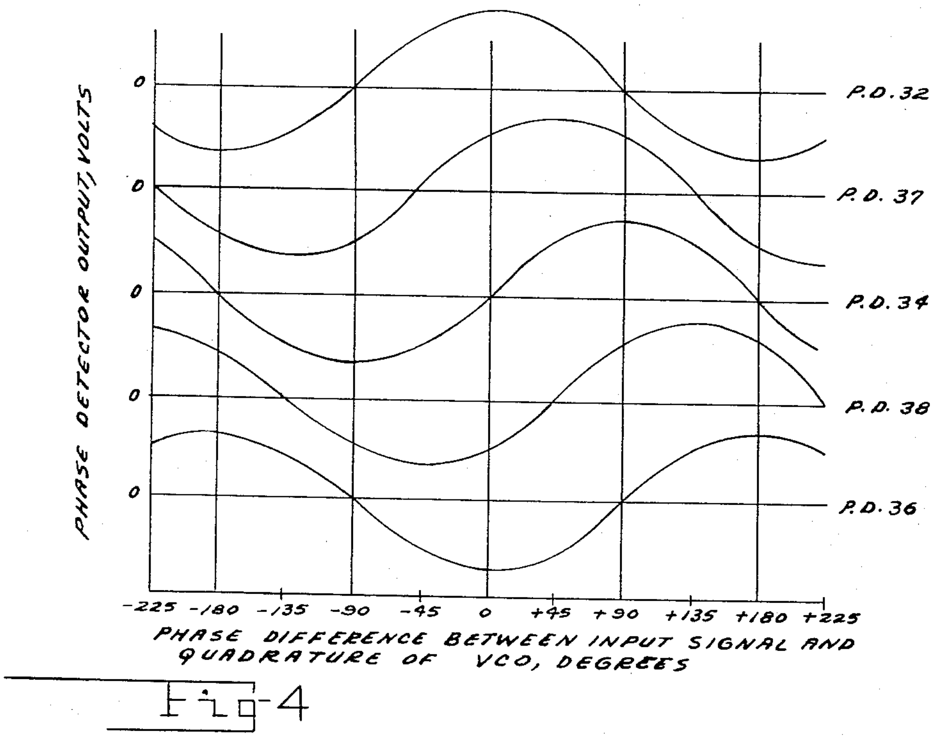

The simultaneous output voltages of all five phase detectors as a function of the instantaneous phase difference between the input signal and the quadrature output of VCO 30 is illustrated in FIG. 4. Since the instantaneous phase difference between the noise-shrouded input signal S and the quadrature of the VCO output will be an analog function of time, the output voltages of all phase detectors likewise may be regarded as analog functions of time.

Figure 6:
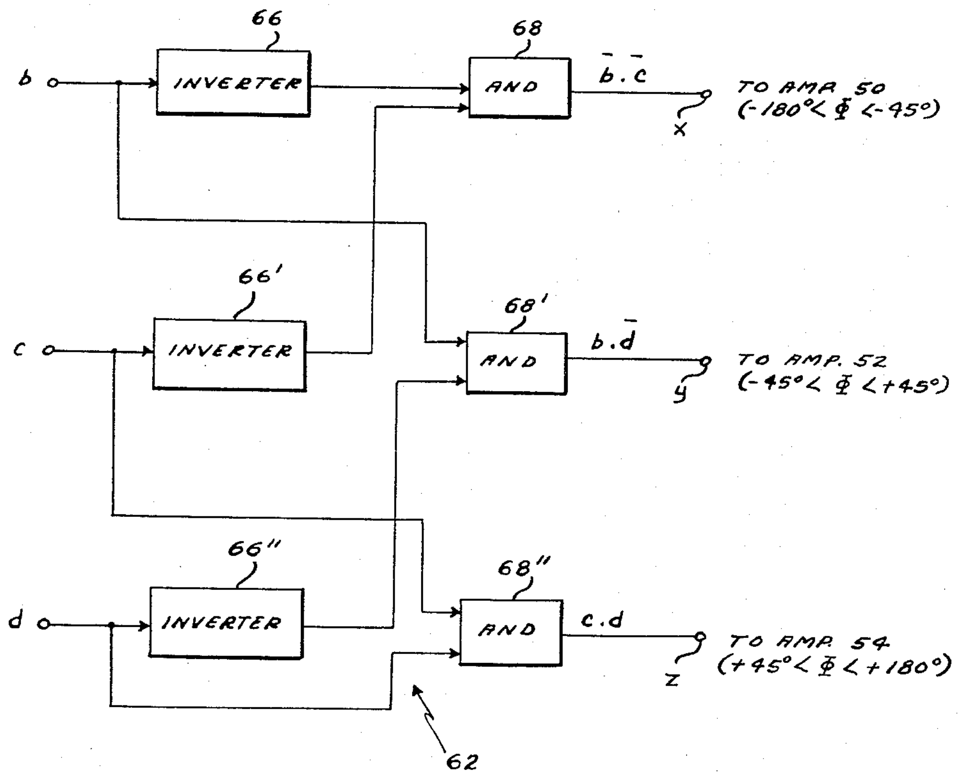
FIG. 6 is a detailed showing of one form of the logic circuit employed in the system shown in FIG. 2.

The outputs of phase detectors 32, 34 and 36 are applied through amplifiers 50, 52 and 54, respectively, to output terminal 31 and to loop filter 28. Phase detector 34 also supplies an input to a threshold detector 56. Similarly, the outputs of phase detectors 37 and 38 are applied to threshold detectors 58 and 60. The outputs of all three threshold detectors 58, 56 and 60 are fed to a logic control 62 having the function of gating one and only one of amplifiers 50, 52 and 54 into operation at any given time, in a manner which will be described when the description of the logic circuit of FIG. 6 is taken up.

Having peak limited the input signal S by the aforesaid bandpass limiting, the peak-to-peak excursions of the output voltage of each of the phase detectors may readily be determined. In the present invention, phase detectors 32, 34 and 36 are selected to have transfer characteristics that are substantially identical. Furthermore, the plate transfer characteristics of amplifiers 50, 52 and 54 are substantially the same. Let it be assumed that amplifiers 50, 52 and 54 are biased to three different quiescent operating points on their respective load lines so that the operating point of amplifier 50 is at a DC voltage lower than the DC voltage at which amplifier 52 is quiescently operating by an amount equal to the peak-to-peak excursion of the output waveform of amplifier 52 multiplied by $\sqrt{2}/2$ when the input signal S is phase modulated from +180° to −180°. For example, for a peak-to-peak variation in amplifier 52 of 100 volts under the preceding conditions, the voltage at the operating point of amplifier 50 will be lower than the quiescent operating voltage of amplifier 52 by 70.7 volts. Similarly, the operating point of amplifier 54 is set above the operating point of amplifier 52 by an amount equal to $\sqrt{2}/2$ times the peak-to-peak excursion of amplifier 52. Again considering a peak-to-peak swing of 100 volts in amplifier 52, the voltage of the operating point of amplifier 54 would be greater than that of amplifier 52 by 70.7 volts. By restricting the gains of amplifiers 50, 52 and 54 to the linear portions of their respective transfer curves, the instantaneous output voltages of amplifiers 50, 52 and 54 may be viewed in terms of the phase difference existing between input signal S and the output of VCO 30.

Figure 5:
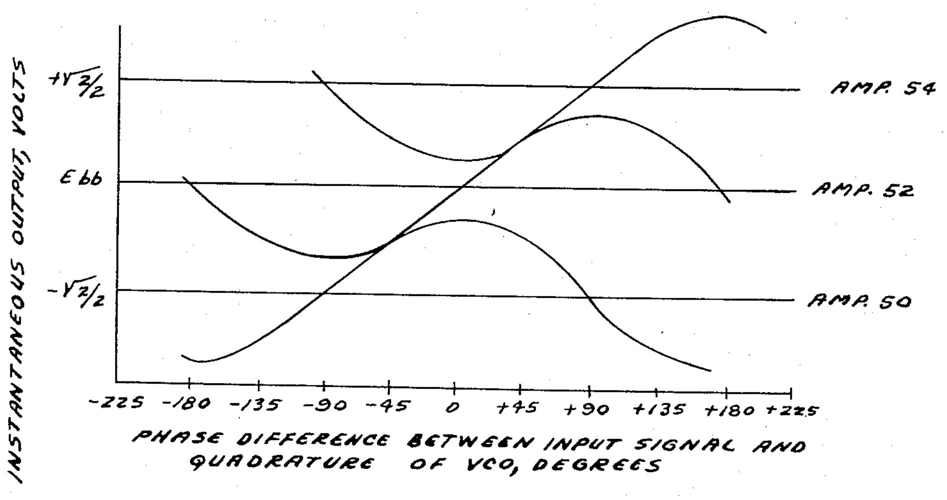

Reference is now made to FIG. 5 which shows curves depicting the simultaneous output of voltages of amplifiers 50, 52 and 54 as a function of the phase difference between input signal S and the quadrature of VCO 30. On the ordinate, the operating points of amplifiers 50, 52 and 54 are marked by the relative values of DC voltages, discussed above, by which their respective operating points are defined. This convenience is better understood by picturing FIG. 5 as the graphical determination of plate voltage response to an input sine wave. FIG. 5 therefore is equivalent to swinging the simultaneous plate voltage curves of amplifiers 50, 52 and 54, operating on separate load lines, counterclockwise by 90°. Adopting this reasoning, it becomes clear that the ordinate of FIG. 5 is the same as an $E_{bb}$ line and that the sinusoids are the varying part of the plate voltage in response to $e_g$. Projecting the abscissa of the curves outwardly to the left of the plane of the paper in FIG. 5 would therefore result in intersection with the load line of each amplifier at the quiescent operating point. The idealized composite transfer characteristic is illustrated by curve B of FIG. 3 which affords a convenient comparison with the allowable peak phase duration of prior art schemes.

In the composite transfer curve, amplifier 52 occupies a central portion and amplifiers 50 and 54 serve as linear extensions of the curve, one above and the other below the transfer curve of amplifier 52. Briefly, then, the selection of the transfer curves of amplifiers 50, 52 and 54, and the corresponding input to loop filter 28, is governed by the following: for an instantaneous phase difference between −45° and +45°, amplifier 52, between +45° and +180°, amplifier 54, and between −180° and −45°, amplifier 50.

To correctly insert amplifiers 50, 52 and 54 under the constraint that operation over the linear part of a transfer characteristic is necessary, threshold detectors 58, 56 and 60 and logic control 62 are used. Let the output voltage of each threshold detector be given by two terms of Boolean variables, such as, for example, an input voltage of one polarity producing a "1" output signal, and an input voltage of the opposite polarity producing a "0" output signal. Such conventions are well known in logic technique and no further elaboration on what particular form the threshold detectors might take is needed here. Accordingly, certain logic combinations of the outputs of detectors 58, 56 and 60 will determine which of amplifiers 50, 52 and 54 are to be employed at any instant, the others remaining dormant during that period of time through want of a control signal. Further, let the output of each threshold detector take on a "1" value if the plate voltage excursion of the companion phase detector ahead of it is positive, and a "0" value for a negative-going plate voltage swing. Accordingly, as one may see from FIG. 4, a relative phase error, $\Phi$, such that $+45° < \Phi < +135°$, causes a "1" occurrence from detector 58 by virtue of the positive sense of the output of phase detector 37. Continuing, a phase error such that $0° < \Phi < +180°$ causes a "1" output from threshold detector 56. A "1" logic is supplied by threshold detector 60 in response to an instantaneous phase error of either $-180° < \Phi - 135°$ or $+45° < \Phi < +180°$.

A detailed schematic diagram of a suitable logic control is given in FIG. 6 with the input and output terminal notations from FIG. 2 carried over unchanged. In the preferred embodiment, logic control 62 comprises parallel channels of identical cascaded inverters 66, 66' and 66'' and AND coincidence gates 68, 68' and 68''. Parallel-ended inputs are applied to input terminals *b*, *c* and *d* so as to produce at output terminals *x*, *y* and *z* gating pulses fed to either amplifier 50, 52 or 54, respectively. For simplicity, the above-described NRZ (non-return to zero) logic is assumed. Each inverter produces an inversion of the bit logic applied thereto. Operation of the AND gates is such that each delivers an output voltage only when "1" signal bits are impressed simultaneously although, if preferred simultaneously applied "0" bits could produce the same result with minor changes to the circuit.

Accordingly, the Boolean functions which relate the inputs at terminals *b*, *c* and *d* to the logic outputs at terminals *x*, *y* and *z* are:

$$x = \bar{b} \cdot \bar{c}$$
$$y = b \cdot \bar{d}$$
$$z = c \cdot d$$

where he symbol "·" denotes the "and" coincidence and "‾" denotes a polarity inversion of the input signal. By way of example, consider, say, a relative phase error of $-135° < \Phi \leftarrow 90°$. Consulting FIG. 5, amplifier 50 alone is operating over the linear part of its transfer characteristic and so logically is the choice. Looking at FIG. 4 for this phase condition, phase detectors 37 and 34 reflect negative-going voltages which are transformed into "0" bits applied to input terminals *b* and *c* of logic control 62. Inversion in inverters 66 and 66' results in simultoneously applied "1" inputs to AND gate 68. Consequently, AND gate 68 delivers an output signal whereby amplifier 50 is selected. Similar analogy through inspection of the curves of FIG. 4 reveals that no output signals are produced at this time at output terminals *y* and *z* of logic control 62. The presence of a relative phase error in the other two ranges previously assumed produces logic conditions at input terminals *b*, *c* and *d* of logic control 62 whereby output terminals *y* and *z* thereof may be energized in their proper turn according to the magnitude and sign of the phase displacement between input signal S and the quadrature of VCO 30.

Accordingly, the present invention provides a communications receiver characterized primarily by a phase-lock loop which permits a recovery of phase modulation over an expanded relative phase error range. Quiescent adjustment of each amplifier produces a composite transfer characteristic curve whose continuity is unbroken in a linear chain extending over the linear part of the transfer characteristic of each amplifier. The described system is particularly adapted for use in the carrier-tracking loop of an *FM/PM* telemetry system. Previous systems of this type have restrained the peak phase deviations of the carrier to remain in the linear portion of the phase detector curve. Peak phase errors thus have been restricted to about 50 degrees or .872 radian. This restriction in allowable peak phase deviation limits the percentage of total transmitted power that can be placed in the useable sidebands. As long as enough carrier power is provided to keep the carrier tracking loop in lock, the principal consideration is to bolster the power in the useable sidebands. Using the extended phase-lock loop of the invention instead of conventional phase detectors presently known permits much larger peak phase deviations in the transmitter without straying from the linear part of the composite transfer characteristic. Peak phase deviations therefore may be chosen which offer significant savings in the total transmitted power. For example, assuming the customary peak phase deviation of 0.872 radian, 67% of the total transmitted power remains in the carrier, 31% of the power appears in the useable sidebands, and 27% appears as waste. On the other hand, by using the phase-lock loop of the described invention, it would be possible to use a deviation figure of say 1.84 radians. This would give only 10% of the total transmitted power remaining in the carrier, while 68% would appear in the useable sidebands with 22% of the power going wasted. Accordingly, by using the hereinabove described system, the same amount of useable sideband power can be delivered to the receiver at a saving of 3.4 db in total transmitted power.

Although only one embodiment of the invention has been illustrated and described, it will be apparent to those skilled in the art that various changes and modifications may be made therein without departing from the spirit of the invention or the scope of the appended claims.

I claim:

1. A phase-look loop circuit comprising: a plurality of phase detectors arranged for parallel-ended inputs, means for providing a phase-modulated amplitude-limited input signal including input line means branches of which extend to respective ones of said phase detectors and simultaneously directing varying voltage thereto, amplifying means coupled to the output of alternate ones of said phase detectors and being biased quiescently to supply voltage-displaced parallel load lines which together define a composite transfer characteristic the linear portion of which is the aggregate of the linear parts of the individual transfer curves of said ampifying means, loop filter means for tracking the output signals of said amplifying means, variable voltage controlled oscillating means connected so as to be controlled by said loop filter means, a plurality of serially-arranged 45° phase-shift means numbering one less than the number of said phase detectors, circuit means for feeding the output of said voltage controlled oscillating means to the first of said phase-shift means in the series arrangement, a direct connection between the output of said voltage controlled oscillating means and the first of said phase detectors in the group ahead of said amplifying means thereby completing one phase-lock loop, circuit means for connecting the output of each of said phase-shift means to the remaining ones of said phase detectors whereby to impose cumulative phase shifts of 45° on the signal from said voltage controlled oscillating means and complete additional phase-lock loops, logic control means controlled by preselected ones of said phase detectors to energize the one of said amplifying means which currently is operating over the linear part of its transfer curve and simultaneously preventing the remaining ones of said amplifying means from operating, whereby the relative phase error between said input signal and the quadrature signal of said voltage controlled oscillating means may vary continuously substantially free of discontinuity in the time function of said composite transfer characteristic, and output means coupled to said amplifying means and adapted to derive therefrom information of the incoming signal.

2. A phase-lock loop circuit comprising: a group of five phase detectors arranged for parallel-ended inputs, means for providing a phase-modulated amplitude-limited input signal including line means branches of which extend to respective ones of said phase detectors and simultaneously directing varying voltage thereto, amplifying means coupled to the output of alternate ones of said phase detectors starting with the first of said group, said amplifying means being biased quiescently on supply-voltage displaced operating points which define for said amplifying means a composite transfer characteristic the linear portion of which is the aggregate of the linear parts of the individual transfer curves of said amplifying means, loop filter means for tracking the output signals of said amplifying means, variable voltage controlled oscillating means connected so as to be controlled by said loop filter means, four serially arranged 45° phase shift means, circuit means for applying said voltage controlled oscillations directly to said first of said phase detectors and to the first of said phase-shift means in the series arrangement whereby a phase-lock loop including said first phase detector is completed, other circuit means for connecting the output of each of said phase-shift means to the remaining ones of said phase detectors, thereby imposing cumulative phase shifts of 45° in said phase-shift means and completing additional phase-lock loops including said third and fifth phase detectors, logic control means controlled by the second, third, and fourth phase detectors of said group to energize the amplifying means which currently is operating over the linear part of its transfer curve and simultaneously preventing the remaining ones of said amplifying means from operating, whereby said amplifying means are separately coupled to said loop filter in accordance with the relative phase error between said input signal and the quadrature signal of said voltage controlled oscillating means, and output means coupled to said amplifying means and adapted to derive therefrom information of said input signal.

3. A phase-lock loop circuit comprising: a group of at least five phase detectors arranged for parallel-ended inputs, input terminal means for providing a phase-modulated input signal with amplitude limiting, said input terminal means being connected to respective ones of said phase detectors such to direct a varying voltage thereto, first, second and third amplifying means coupled to the ouptut of the first, third and fifth phase detectors, respectively, of said group, said first amplifying means being biased to an operating point defined by a unidirectional voltage lower than the unidirectional voltage at the operating point of said second amplifying means by an amount equal to the peak-to-peak excursion of said second amplifying means times $\sqrt{2}/2$ when said input signal is phase modulated from +180° to −180°, said third amplifying means being biased to an operating point defined by a unidirectional voltage higher than the unidirectional voltage at the operating point of said second amplifying means by an amount equal to the peak-to-peak excursion of said second amplifying means times $\sqrt{2}/2$ when said input signal is phase modulated from +180° to −180°, said operating points of said amplifying means defining a composite transfer characteristic the linear portion of which is the aggregate of the linear parts of the individual transfer curves of said amplifying means, loop filter means for tracking the output signals of said amplifying means, variable voltage controlled oscillating means connected so as to be controlled by said loop filter means, four serially arranged 45° phase shift means in cascade, circuit means for applying said voltage controlled oscillations to said first phase detector and to the first of said phase shift means in the series arrangement whereby a phase-lock loop including said first phase detector is completed, other circuit means for connecting the output of each of said phase-shift means to the remaining ones of said phase detectors thereby imposing cumulative phase shifts of 45° on said voltage controlled oscillations and completing additional phase-lock loops including said third and fifth phase detectors, logic control means controlled by the second, third and fourth phase detectors of said group to energize said amplifying means which currently is operating over the linear part of its transfer curve and preventing the remaining ones of said amplifying means from operating, whereby said amplifying means are separately coupled to said loop filter in accordance with the relative phase error between said input signal and the quadrature signal of said voltage controlled oscillating means, and output means coupled to said amplifying means and adapted to derive therefrom information of said input signal.

4. A phase-lock loop in accordance with claim 3 wherein said logic control means comprises first, second, and third input terminals responsive, respectively, to the outputs of said second, third and fourth phase detectors, and first, second and third output terminal means connected in energizing controlling relation to said first, second and third amplifying means, respectively, three logic channels each including an inverter and an AND gate connected in cascade between said first input and output terminals, said second input and output terminals, and said third input and output terminals, first circuit means coupling said first input terminal to the AND gate in said second channel, second circuit means coupling said inverter in said second channel to the AND gate in said first channel, third circuit means coupling said second input terminal to the AND gate in said third channel, fourth circuit means coupling the inverter in said third channel to the AND gate in said second channel, and fifth circuit means coupling said third input terminal to the AND gate in said third channel.

References Cited

UNITED STATES PATENTS

| | | | |
|---|---|---|---|
| 3,199,037 | 8/1965 | Graves | 328—155 |
| 3,204,185 | 8/1965 | Robinson | 329—122 X |
| 3,336,534 | 8/1967 | Gluth | 331—12 |

ALFRED L. BRODY, *Primary Examiner.*